US008864209B2

(12) United States Patent
White et al.

(10) Patent No.: US 8,864,209 B2
(45) Date of Patent: Oct. 21, 2014

(54) ONE TOUCH STOW IN FLOOR SEAT ASSEMBLY WITH AUTOMATIC LATERAL DISPLACEMENT

(75) Inventors: David A. White, Grand Blanc, MI (US);
Prasad D. Jagtap, Farmington, MI (US); Alan Proulx, West Bloomfield, MI (US); Timothy Jon Brush, West Bloomfield, MI (US); Jeffrey P. Carroll, West Bloomfield, MI (US); Omar D Tame, West Bloomfield, MI (US); Robert Thomas Coffey, Canton, MI (US); Rabindranath Persad, Brighton, MI (US); Douglas A Dingel, Brighton, MI (US); Nelson E Hurst, Westland, MI (US); Jerzy Dziedzic, Milford, MI (US); Lei Cao, Farmington Hills, MI (US); Brian Adwell, Waterford, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 13/885,402
(22) PCT Filed: Nov. 15, 2011
(86) PCT No.: PCT/CA2011/001269
§ 371 (c)(1),
(2), (4) Date: Sep. 12, 2013
(87) PCT Pub. No.: WO2012/065252
PCT Pub. Date: May 24, 2012

(65) Prior Publication Data
US 2013/0341953 A1 Dec. 26, 2013

Related U.S. Application Data

(60) Provisional application No. 61/413,585, filed on Nov. 15, 2010.

(51) Int. Cl.
*B60N 2/02* (2006.01)
*B60N 2/12* (2006.01)
*B60N 2/30* (2006.01)
*B60N 2/06* (2006.01)
*B60N 2/22* (2006.01)
*B60N 2/48* (2006.01)
*B60N 2/44* (2006.01)

(52) U.S. Cl.
CPC ......... *B60N 2/3097* (2013.01); *B60N 2002/445* (2013.01); *B60N 2/12* (2013.01); *B60N 2/3065* (2013.01); *B60N 2/065* (2013.01); *B60N 2/22* (2013.01); *B60N 2/3079* (2013.01); *B60N 2002/126* (2013.01); *B60N 2002/4465* (2013.01); *B60N 2/3011* (2013.01); *B60N 2/487* (2013.01)
USPC ....................................................... 296/65.01

(58) Field of Classification Search
USPC ........... 296/65.01, 65.09, 65.03, 65.13, 65.16
See application file for complete search history.

(56) References Cited

U.S. PATENT DOCUMENTS 4,484,776 A 11/1984 Gokimoto et al.
4,627,656 A 12/1986 Gokimoto et al.
(Continued)

FOREIGN PATENT DOCUMENTS

WO  0021778  4/2000
WO  2010043030  4/2010

*Primary Examiner* — Kiran B Patel
(74) *Attorney, Agent, or Firm* — Miller Canfield

(57) ABSTRACT

A seat assembly is provided for supporting in an automotive vehicle. The seat assembly comprises a seat cushion and a seat back pivotally coupled to the seat cushion for movement between a reclined seating position and a fold flat position. A recliner assembly is coupled between the seat back and the seat cushion to provide pivotal movement of the seat back. A riser assembly is pivotally coupled to the seat cushion and pivotally latched to the floor to allow pivotal movement of the seat cushion between a horizontal seating position and a forwardly upright tumbled position. A release mechanism is coupled between the seat back and the riser assembly for automatically synchronizing actuation of the recliner assembly and the riser assembly to provide movement of the seat assembly to the tumbled position in response to the pivotal movement of the seat back to the fold flat position.

21 Claims, 11 Drawing Sheets

(56) References Cited

U.S. PATENT DOCUMENTS

| | | | |
|---|---|---|---|
| 4,705,319 A * | 11/1987 | Bell | 297/362 |
| 5,522,643 A * | 6/1996 | Matsuura | 297/367 R |
| 5,971,467 A * | 10/1999 | Kayumi et al. | 296/66 |
| 6,065,804 A * | 5/2000 | Tanaka et al. | 297/336 |
| 6,139,104 A * | 10/2000 | Brewer | 297/353 |
| 6,158,800 A | 12/2000 | Tsuge et al. | |
| 6,540,272 B2 * | 4/2003 | Spurr | 292/216 |
| 6,860,562 B2 * | 3/2005 | Bonk | 297/378.12 |
| 6,910,739 B2 * | 6/2005 | Grable et al. | 297/378.12 |
| 7,021,716 B2 * | 4/2006 | Persad et al. | 297/378.12 |
| 7,296,840 B2 * | 11/2007 | Martone et al. | 296/65.03 |
| 7,393,056 B2 * | 7/2008 | O'Connor | 297/378.12 |
| 7,431,371 B2 * | 10/2008 | Miller et al. | 296/65.03 |
| 7,690,728 B2 * | 4/2010 | Miyauchi et al. | 297/378.12 |
| RE41,964 E * | 11/2010 | Hellrung et al. | 297/336 |
| 8,096,618 B2 * | 1/2012 | Bruck et al. | 297/378.11 |
| 8,197,001 B2 * | 6/2012 | Grable et al. | 297/61 |
| 8,408,648 B2 * | 4/2013 | Champ | 297/335 |
| 8,439,443 B2 * | 5/2013 | Nakane et al. | 297/378.12 |
| 8,511,723 B2 * | 8/2013 | Otsuka | 292/216 |
| 8,523,262 B2 * | 9/2013 | Haeske et al. | 296/65.03 |
| 8,540,308 B2 * | 9/2013 | Aoki et al. | 297/15 |
| 2005/0179301 A1 | 8/2005 | Clark et al. | |
| 2005/0218685 A1 * | 10/2005 | Liu et al. | 296/65.03 |
| 2008/0203801 A1 * | 8/2008 | Jammalamadaka et al. | 297/408 |
| 2010/0078972 A1 * | 4/2010 | Sayama | 297/61 |
| 2012/0242106 A1 * | 9/2012 | Blake et al. | 296/65.03 |

* cited by examiner

ONE TOUCH STOW IN FLOOR SEAT ASSEMBLY WITH AUTOMATIC LATERAL DISPLACEMENT

BACKGROUND OF THE INVENTION

1. Field of the Invention

The invention relates to a seat assembly for an automotive vehicle, and more particularly, to a release mechanism for automatically displacing the seat assembly from an upright seating position to a stowed position recessed within the floor of an automotive vehicle.

2. Description of the Related Art

Automotive vehicles include seat assemblies for supporting occupants within the vehicle. The seat assemblies typically include a seat cushion and a seat back operatively coupled to the seat cushion by a recliner mechanism for allowing selective pivotal adjustment of the seat back relative to the seat cushion between a plurality of reclined seating positions. The seat back is also commonly moveable between any one of the reclined seating positions and a generally horizontal fold flat position overlying the seat cushion to present a load floor surface on the back of the seat back.

It is also known in the automotive seating art to mount a riser assembly between the seat cushion and the floor of the vehicle for moving the seat assembly between a seating position, with the seat back in one of the reclined seating positions and the seat cushion spaced above the floor, and a stowed position, with the seat back in the fold flat position and the seat assembly stowed within a recess in the floor of the vehicle. The seat assembly typically includes a first release mechanism for actuating the recliner mechanism to provide pivotal movement of the seat back between the reclined seating positions and the fold flat position and a separate second release mechanism for actuating the riser assembly to provide movement of the seat assembly between the seating position and the stowed position.

It is also common to provide a head restraint mounted to the top of the seat back for supporting the head of the seat occupant. The head restraint is typically pivotal between an upright support position and a forwardly folded position against the seat back to allow pivotal movement of the seat back to the fold flat position. A separate third release mechanism is generally provided to actuate the head restraint between the support position and folded position.

It remains desirable to provide a single release mechanism which sequentially actuates each of the head restraint, recliner mechanism, and riser assembly to provide automatic movement of the seat assembly between the upright seating position and the stowed position recessed within the floor of the vehicle.

SUMMARY OF THE INVENTION

According to one aspect of the invention a seat assembly is provided for supporting an occupant above a floor of an automotive vehicle. The seat assembly comprises a seat cushion and a seat back pivotally coupled to the seat cushion for movement between a plurality of reclined seating positions and a fold flat position overlying the seat cushion. A recliner assembly is operatively coupled between the seat back and the seat cushion for actuation between a locked condition and an unlocked condition to provide pivotal movement of the seat back. A riser assembly is pivotally coupled to the seat cushion and adapted to be pivotally latched to the floor for actuation between a latched condition and unlatched condition to allow pivotal movement of the seat cushion between a horizontal seating position and a forwardly upright tumbled position with the seat back in the fold flat position. A release mechanism is operatively coupled between the seat back and the riser assembly for automatically synchronizing actuation of the recliner assembly and the riser assembly to provide movement of the seat assembly to the tumbled position in response to the pivotal movement of the seat back to the fold flat position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
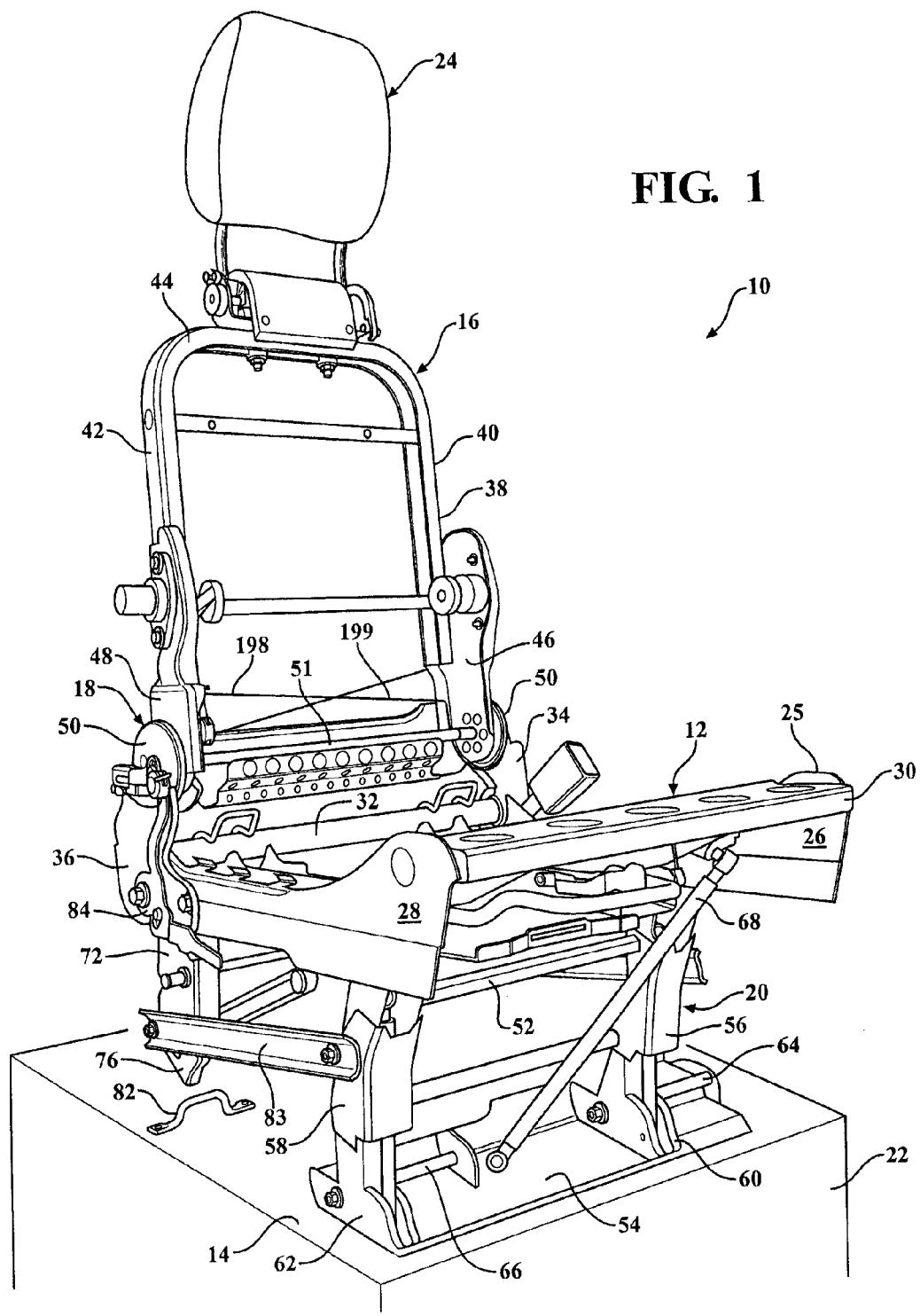
FIG. 1 is a perspective view of the seat assembly according to one aspect of the invention.

Referring to the Figures, a seat assembly for an automotive vehicle according to a preferred embodiment of the invention, is generally indicated at 10 in FIG. 1. The seat assembly 10 includes a seat cushion 12 for supporting an occupant above a floor 14 in the vehicle and a seat back 16 for supporting the back of the occupant seated on the seat cushion 12. A recliner assembly 18 is coupled between the seat cushion 12 and the seat back 16 for providing selective locking and pivotal adjustment of the seat back 16 relative to the seat cushion 12 between a plurality of reclined seating positions and a forwardly folded flat position overlying the seat cushion 12. The seat assembly 10 includes a riser assembly 20 coupled between seat cushion 12 and the floor 14 of the vehicle that allows movement of the seat assembly 10 between a seating position and a forwardly tumbled position. The riser assembly 20 also allows movement of the seat assembly 10 between the forwardly tumbled position and a forwardly stowed position preferably nested within a recess 22 in the floor 14 that is offset laterally inboard in the vehicle relative to the seating position. Alternatively, the forwardly stowed position may be resting against the upper surface of the floor 14. The seat assembly 10 also includes a head restraint 24 pivotally coupled to the top of the seat back 16 for selective pivotal movement between an upright support position for supporting the seat occupant's head and a folded position pivoted against the front surface of the seat back 16.

Figure 2A:
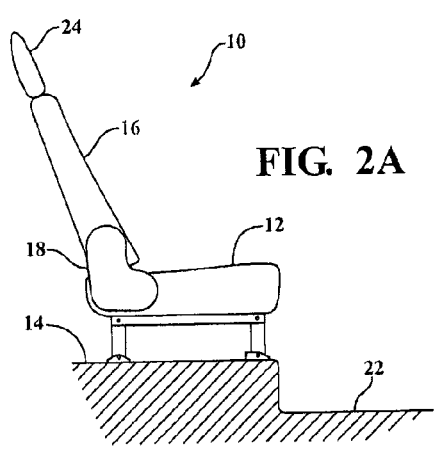
FIG. 2A is a side view of the seat assembly with the seat back in a reclined position.
Figure 2B:
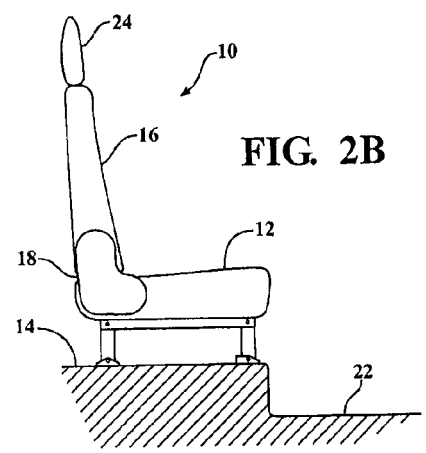
FIG. 2B is a side view of the seat assembly with the seat back in an upright position.
Figure 2C:
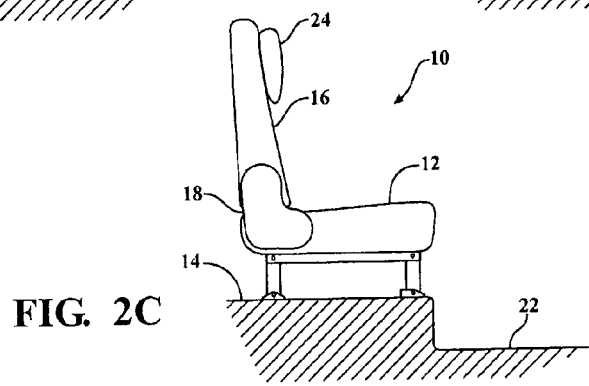
FIG. 2C is a side view of the seat assembly with the head restraint in a folded position.
Figure 2D:
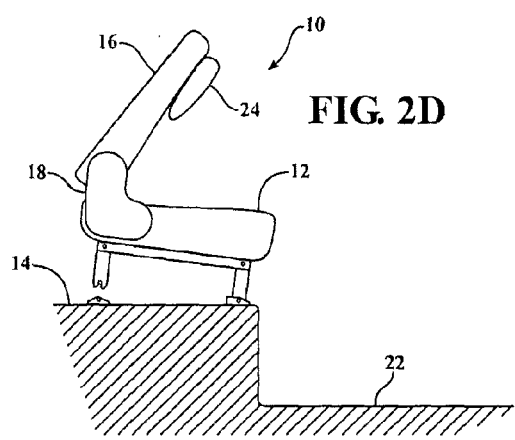
FIG. 2D is a side view of the seat assembly with the seat back pivoting to the fold flat position.
Figure 2E:
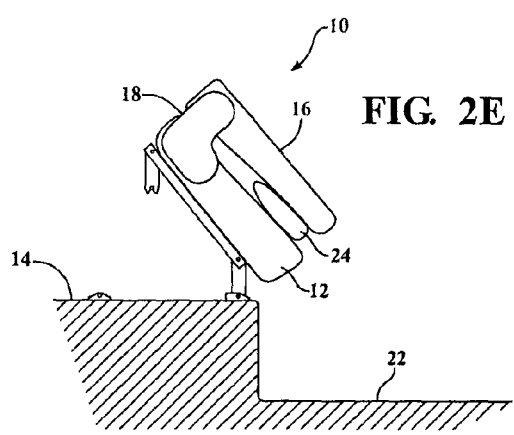
FIG. 2E is a side view of the seat assembly with the seat back in the fold flat position.
Figure 2F:
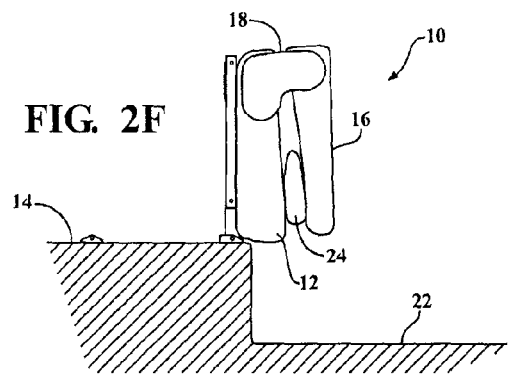
FIG. 2F is a side view of the seat assembly in a tumbled position with the seat back in the fold flat position and the seat cushion released from the floor and pivoting toward the stowed position.
Figure 2G:
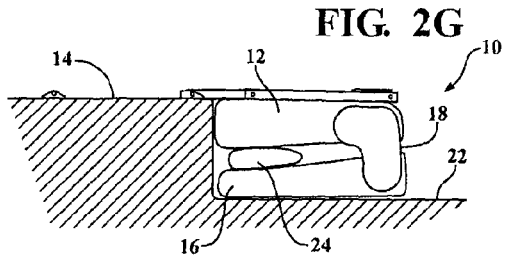
FIG. 2G is a side view of the seat assembly in the stowed position within the recess in the vehicle floor.

Referring to FIGS. 2A-2F, the seat assembly 10 is shown moving from one of a plurality of reclined seating positions to the stowed position. In FIG. 2A, the seat assembly 10 is in a seating position with the seat cushion 12 spaced above the vehicle floor 14 and the seat back 16 in a reclined position. In FIG. 2B, the seat back 16 is pivoted to an upright position. In FIG. 2C, the head restraint 24 has been released and pivoted from the support position to the folded position flush against the front surface of the seat back 16. In FIG. 2D, the seat back 16 is pivoting toward the fold flat position and the riser assembly 20 has been released from the floor 14. In FIG. 2E, the seat back 16 is in the fold flat position and the seat assembly 10 is pivoting toward the forwardly tumbled position. In FIG. 2F, the seat assembly 10 is in the forwardly tumbled position. And in FIG. 2G, the seat assembly 10 is shown in the stowed position recessed within the recess 22 of the floor 14.

Referring again to FIG. 1, the seat cushion 12 includes a seat cushion frame 25 having generally parallel inboard 26 and outboard 28 side members. Front 30 and rear 32 cross members are fixedly secured to and extend axially between the inboard 26 and outboard 28 side members. A seat cushion bracket 34, 36 is fixedly secured to each of the respective side members 26, 28 adjacent the rear cross member 32. The seat back 16 includes a seat back frame 38 including generally parallel inboard 40 and outboard 42 side members extending between a lower end and an upper end. The upper ends of the side members 40, 42 are interconnected by an upper cross member 44. A seat back bracket 46, 48 is fixedly secured to the lower ends of each of the respective side members 40, 42. A disc recliner 50, as is commonly known in the art, is operatively coupled between each of the seat cushion brackets 34, 36 and seat back brackets 46, 48 for providing selective pivotal movement of the seat back 16 relative to the seat cushion 12 between a plurality of reclined positions and the fold flat position. The disc recliners 50 are interconnected by a cross talk rod 51 for synchronizing actuation of the recliners 50 between a locked condition and an unlocked condition allowing pivotal movement of the seat back 16 relative to the seat cushion 12.

Figure 12:
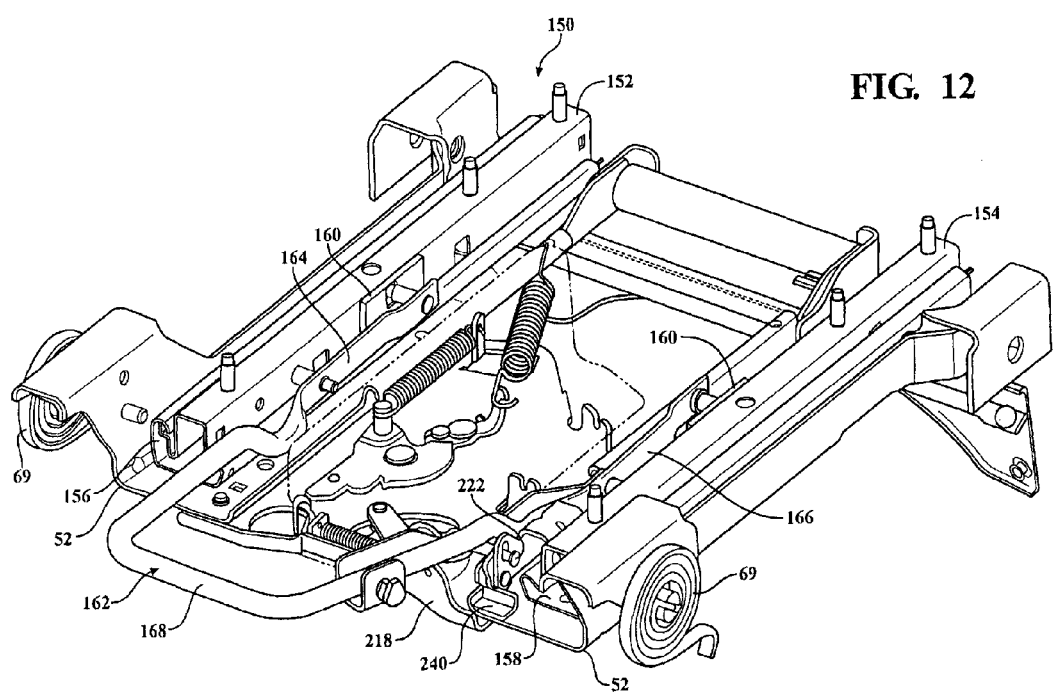
FIG. 12 is a perspective view of the release mechanism in the locked position and seat track assembly.

The riser assembly 20 supports the seat cushion 12 above the floor 14 of the vehicle. The riser assembly 20 includes an upper support plate 52 coupled to the seat cushion 12 and a lower support plate 54 fixedly secured to the vehicle floor 14. The riser assembly 20 includes generally parallel inboard 56 and outboard 58 front legs extending between an upper end pivotally coupled to the upper support plate 52 and a lower end pivotally coupled to a pivot bracket 60, 62. The pivot brackets 60, 62 are slidably coupled to the lower support plate 54 for providing lateral movement of the seat assembly 10 as the seat assembly 10 pivots forwardly from the seating position to the stowed position. More specifically, the lower support plate 52 includes a pair of slide rods 64, 66 extending laterally therealong. The pivot brackets 60, 62 are slidably coupled to the respective slide rods 64, 66 for lateral sliding movement therealong. A transfer rod 68 extends between a first end connected to the upper support plate 52 adjacent the inboard front leg 56 and a second end connected to the lower support plate 54 adjacent the outboard front leg 58. As the seat cushion 12 pivots forwardly about the upper ends of the front legs 56, 58 from the tumbled position to the stowed position, the transfer rod 68 pushes against the lower support plate 54 forcing the pivot brackets 60, 62 to slide laterally along the slide rods 64, 66. An assist clock spring 69, shown in FIG. 12, is coupled between the upper support plate 52 and the front legs 56, 58 for assisting movement of the seat cushion 12 between the seating and forwardly tumbled position.

Figure 7:
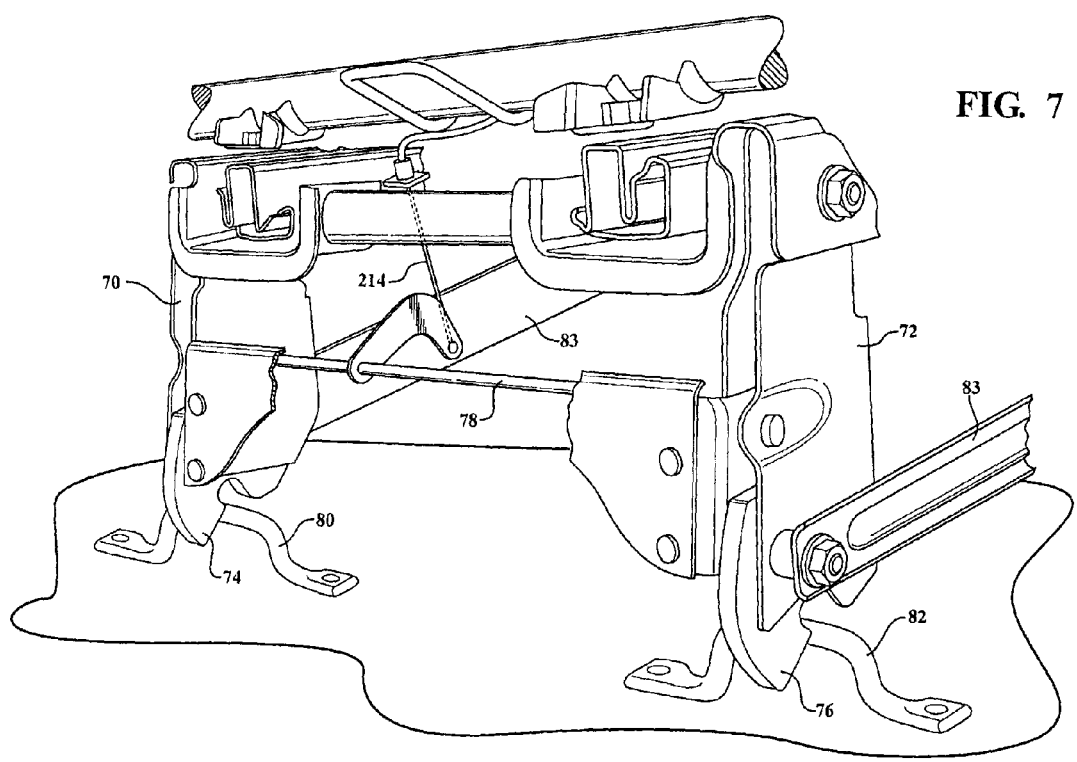
FIG. 7 is a fragmentary perspective view of the riser assembly released from the floor of the vehicle.

Referring to FIGS. 1 and 7, the riser assembly 20 further includes generally parallel inboard 70 and outboard 72 rear legs each extending between an upper end pivotally coupled to the upper support plate 52 and an opposite lower end. The lower ends of each rear leg 70, 72 includes a latch hook 74, 76 pivotally connected to the rear legs 70, 72 and interconnected by a synch rod 78 for actuating the latch hooks 74, 76 between a latched condition engaged with striker bars 80, 82 fixed to the vehicle floor 14 and an unlatched condition released from the striker bars 80, 82, as is commonly known by persons of ordinary skill in the art. A link 83 extends between each rear leg 70, 72 and a respective front leg 56, 58 for moving the rear legs 70, 72 between extended and retracted positions in response to movement of the seat cushion 12 between the seating and forwardly dumped positions, respectively. Alternatively, a single link may interconnect one of the rear legs 70, 72 to one of the front legs 56, 58 with a rod interconnecting the rear legs 70, 72 together so that both rear legs 70, 72 move between the extended and retracted positions in response to the movement of the seat cushion 12 between the seating and forwardly dumped positions, respectively. Further details and description of the riser assembly 20 are set forth in U.S. Pat. No. 7,484,785 which is incorporated by reference herein in its entirety.

Figure 3:
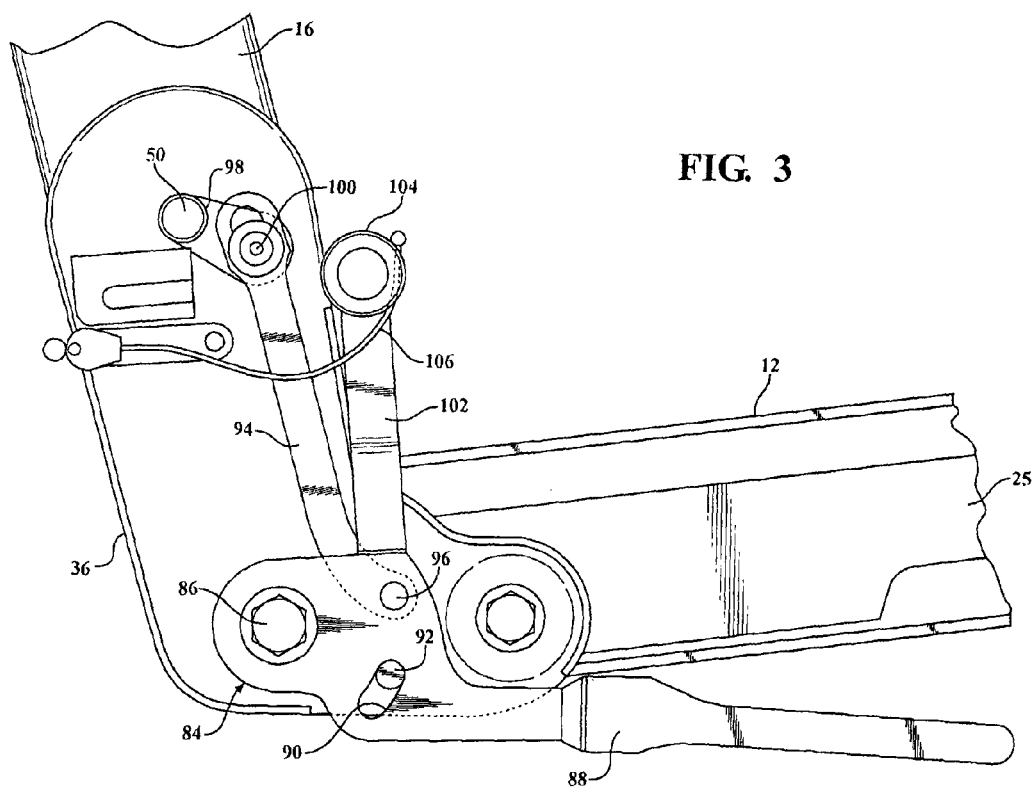
FIG. 3 is a side view of a release lever of the release mechanism in a locked condition.
Figure 4:
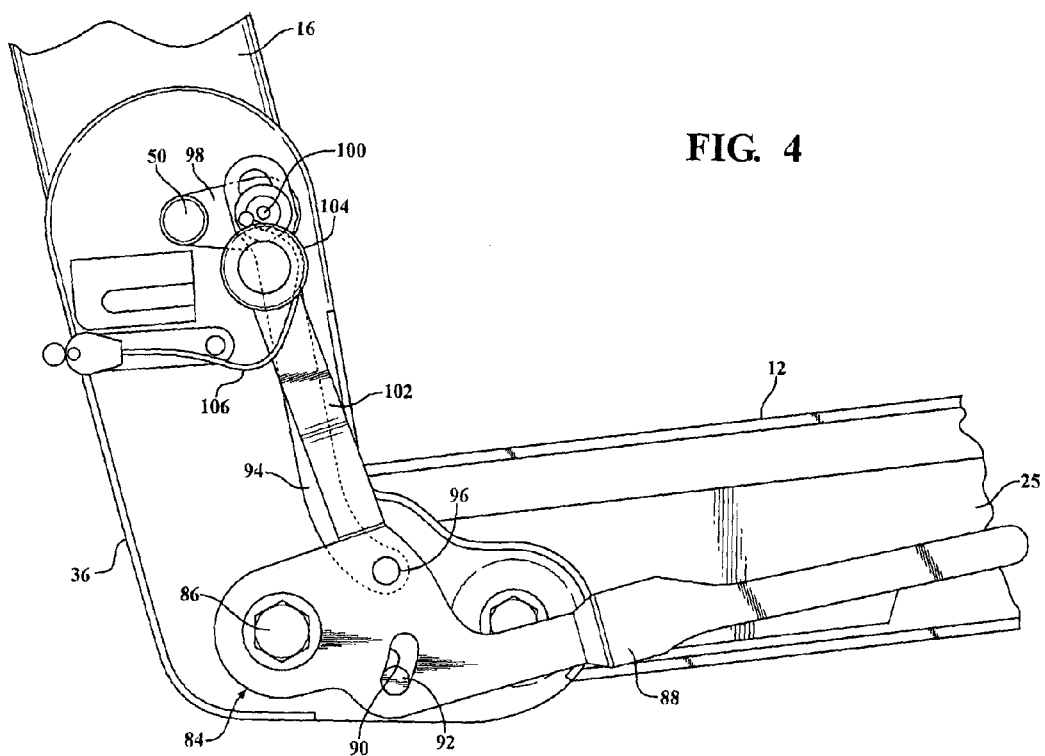
FIG. 4 is side view of the release lever of the release mechanism in an unlocked condition.

Referring to FIGS. 3 and 4, a release lever 84 is pivotally coupled to the seat cushion bracket 36 at pivot 86 for actuating the disc recliners 50. The release lever 84 includes a main lever 88 aligned generally parallel to the seat cushion frame 25 extending between a proximal end connected to the seat cushion bracket 36 by pivot 86 and an opposite distal end. The main lever 88 includes an arcuate slot 90 for receiving a guide pin 92 for guiding pivotal movement of the main lever 88. A control lever 94 extends between a first end pivotally connected to the main lever 88 at pivot 96 and an opposite second end operatively coupled to the disc recliner 50. A recliner lever 98 extends from the disc recliner 50 for pivotal connection to the second end of the control lever 94 at pivot 100. In operation, pivotal movement of the release lever 84 actuates the disc recliner 50 from the locked condition, as shown in FIG. 3, to the unlocked condition, as shown in FIG. 4. More specifically, upward pivotal movement of the main lever 88 about pivot 86 forces the control lever 94 to pivot the recliner lever 98 to actuate the disc recliner 50 from the locked condition to the unlocked condition allowing pivotal movement of the seat back 16 relative to the seat cushion 12. The release lever 84 also includes a rear control lever 102 having a first end connected to the main lever 88 and an opposite second end having a pulley 104. A cable 106 extends around the pulley 104 with a first end fixed to the seat cushion bracket 36 and a second end for pulling the cable 106 and pivoting the main lever about pivot 86 to actuate the disc recliner 50 from a remote location, such as behind the seat assembly 10.

Figure 5:
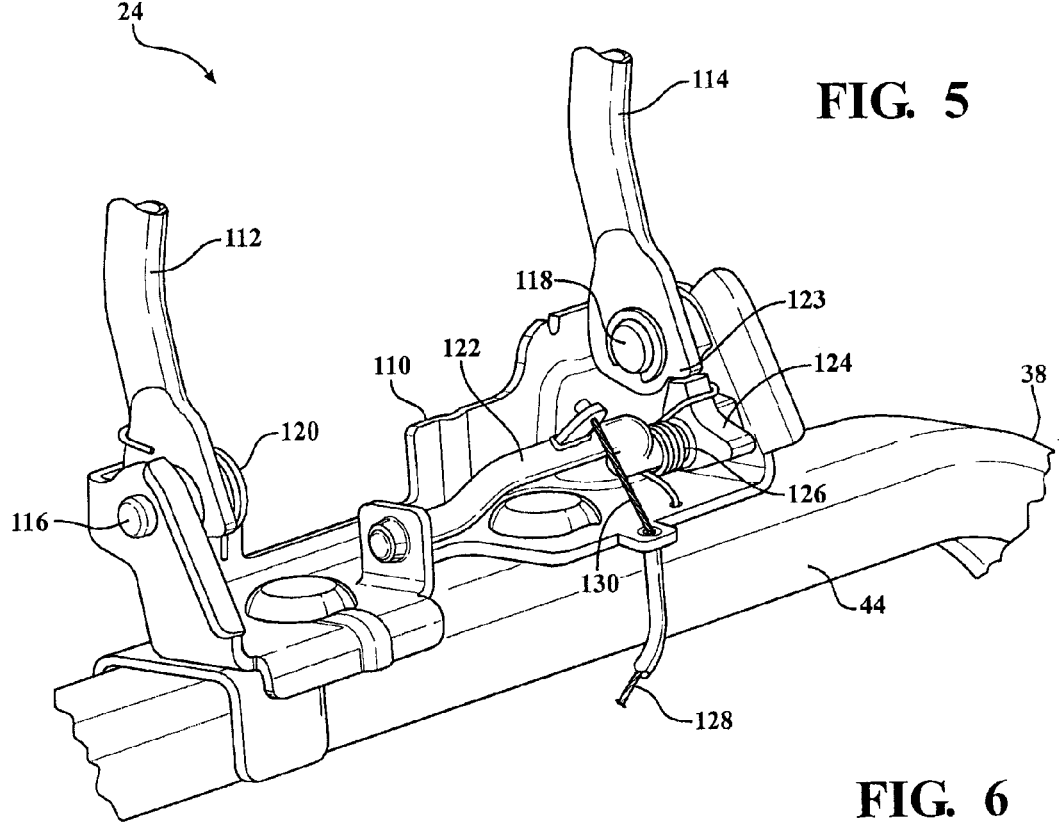
FIG. 5 is perspective view of a head restraint locking mechanism with the head restraint locked in the support position.
Figure 6:
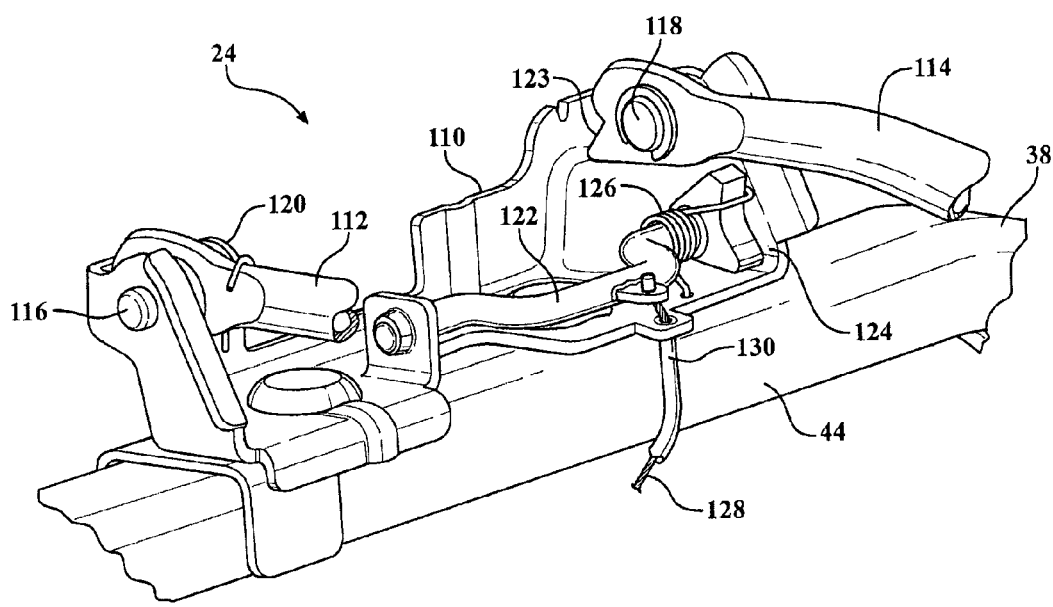
FIG. 6 is a perspective view of the head restraint locking mechanism with the head restraint released in the folded position.

Referring to FIGS. 5 and 6, the head restraint 24 is shown connected to the upper cross member 44 of the seat back frame 38. A pivot bracket 110 is fixedly secured to the upper cross member 44. The head restraint 24 includes a pair of head restraint posts 112, 114 pivotally coupled to the pivot bracket 110 by pivot pins 116, 118. A torsion spring 120 is coupled between one of the head restraint posts 112, 114 and the pivot bracket 110 for biasing the head restraint 24 to the folded position. A generally U-shaped release arm 122 is pivotally connected to the pivot bracket 110. A locking pawl 124 projects from one end of the release arm 122 for locking engagement with a notch 123 in the distal end of one of the head restraint posts 112, 114 for locking the head restraint 24 in the upright support position. More specifically, the release arm 122 is pivotal between a locked condition with the locking pawl 124 engaged with the notch 123 in the head restraint post 114 for locking the head restraint 24 in the upright support position and an unlocked condition with the locking pawl 124 released from engagement with the notch 123 for allowing the head restraint 24 to pivot to the folded position. A torsion spring 126 is coupled between the locking pawl 124 and pivot bracket 110 for biasing the release arm 122 and locking pawl 124 into engagement with the notch 123 in the head restraint post 114.

Figure 8:
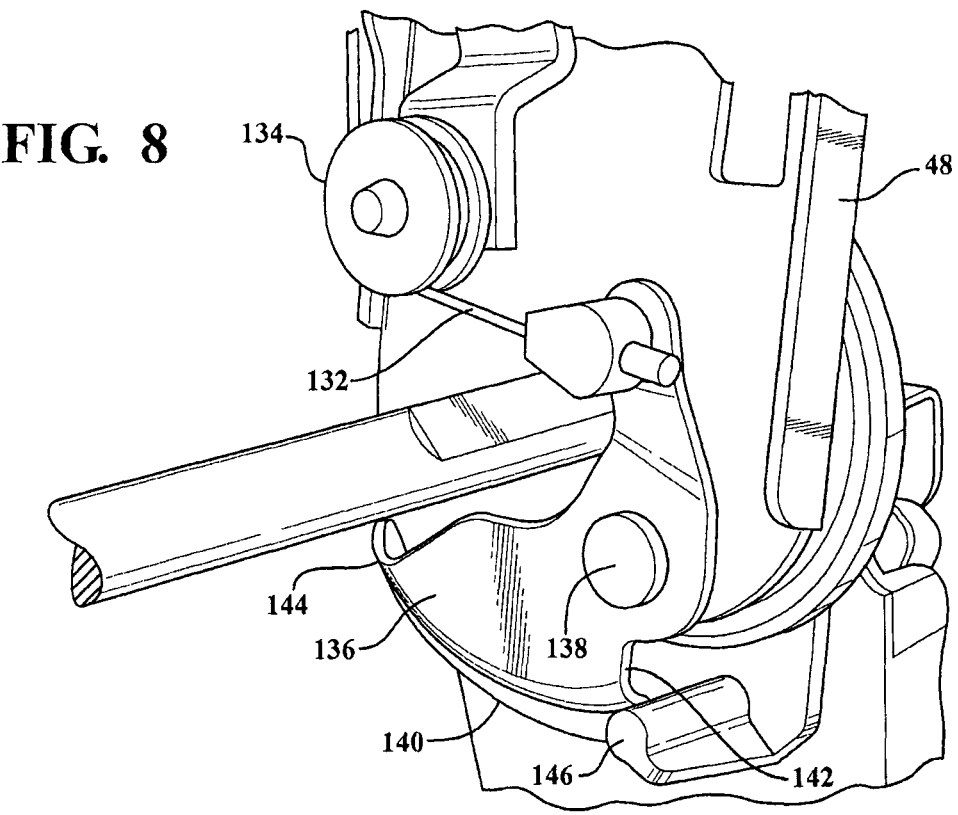
FIG. 8 is a fragmentary perspective view of a release cam for releasing the head restraint in the support position.
Figure 9:
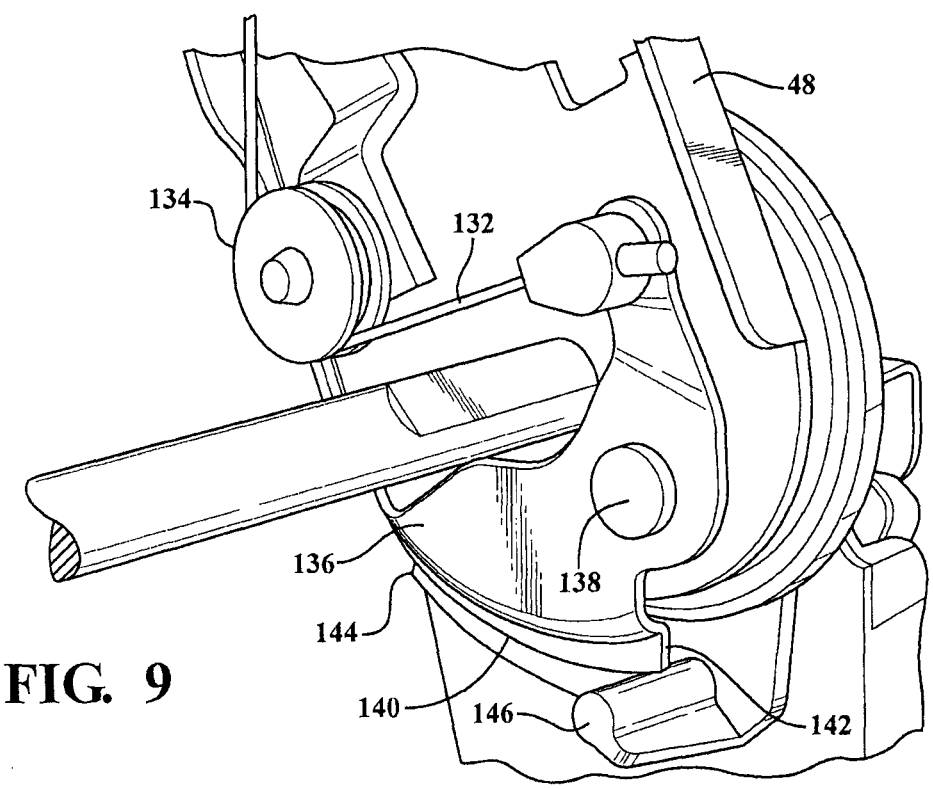
FIG. 9 is a fragmentary perspective view of the release cam for releasing the head restraint in the folded position.

Further, a cable 128 extends from the release arm 122 to the seat back 16 for automatically actuating the release arm 122 from the locked to unlocked condition and allowing pivotal movement of the head restraint 24 from the upright support position to the folded position in response to pivotal movement of the seat back 16 to the fold flat position. More specifically, while referring also to FIGS. 8 and 9, a first end 130 of the cable 128 is connected to the release arm 122 and an opposite second end 132 extends around a pulley 134 mounted to the seat back bracket 48 and is connected to a release cam 136. The release cam 136 is pivotally connected to the seat back bracket 48 by pivot 138. The release cam 136 includes a lower curved cam profile edge 140 extending from a notched proximal end 142 to an opposite distal end 144. A cam lobe 146 is fixedly secured to the seat back bracket 48 adjacent the release cam 136 for engagement with the cam profile edge 140.

In operation, as the seat back 16 pivots between the plurality of reclined seating positions, the cam lobe 146 is clear from engagement behind the notched proximal end 142 of the release cam 136 to maintain the head restraint 24 in the upright support position. As the seat back 16 pivots toward the fold flat position, the cam lobe 146 engages the notched proximal end 142 of the release cam 136 to rotate the release cam 136 about the pivot 138 in the clockwise direction. Rotation of the release cam 136 pulls on the cable 128 to in turn rotate the release arm 122 downwardly against the biasing force of the torsion spring 126. The rotation of the release arm 122 rotates the locking pawl 124 out of engagement with the notch 123 in the head restraint post 114 to allow the head restraint 24 to automatically pivot from the upright support position to the folded position. As the seat back 16 continues to pivot to the fold flat position, the cam lobe 146 rides along the cam profile edge 140 of the release cam 136 to prevent additional tension on the cable 128. When the seat back 16 is returned to a reclined seating position, the head restraint 24 may be manually pivoted from the folded position to the upright support position. The cam lobe 146 is clear from the notched end 142 of the release cam 136 to release the tension on the cable 128. The torsion spring 126 rotates the release arm 122 and returns the locking pawl 124 into locking engagement with the notch 123 in the head restraint post 114 to maintain the head restraint 24 in the upright support position.

Referring to FIG. 12, the seat assembly 10 further includes a track assembly 150 operatively coupled between the seat cushion 12 and the riser assembly 20 for providing fore and aft sliding adjustment of the seat assembly 10 along the floor 14 of the vehicle. The track assembly 150 includes a pair of spaced apart and parallel upper tracks 152, 154 fixedly secured to the seat cushion frame 25 and a pair of spaced apart and parallel lower tracks 156, 158 fixedly secured to the upper support plate 52 of the riser assembly 20 and slidably coupled to the upper tracks 152, 154, respectively. The upper tracks 152, 154 provide sliding movement of the seat cushion 12 along the lower tracks 156, 158. A seat track locking mechanism 160 is operatively coupled between the upper tracks 152, 154 and lower tracks 156, 158 for selectively locking the track assembly 150, as is commonly known in the art. The track assembly 150 further includes a generally U-shaped towel bar 162 having first and second arms 164, 166 interconnected by a front bar 168 adjacent the front cross member 30 of the seat cushion frame 25. Each arm 164, 166 is pivotally connected to the upper track 152, 154, respectively, and the corresponding locking mechanism 160 for actuating the locking mechanism 160 between locked and unlocked conditions in response to upward pivotal movement of the towel bar 162 to provide fore and aft sliding movement of the seat cushion 12 relative to the riser assembly 20, as is also commonly known in the art.

Figure 10:
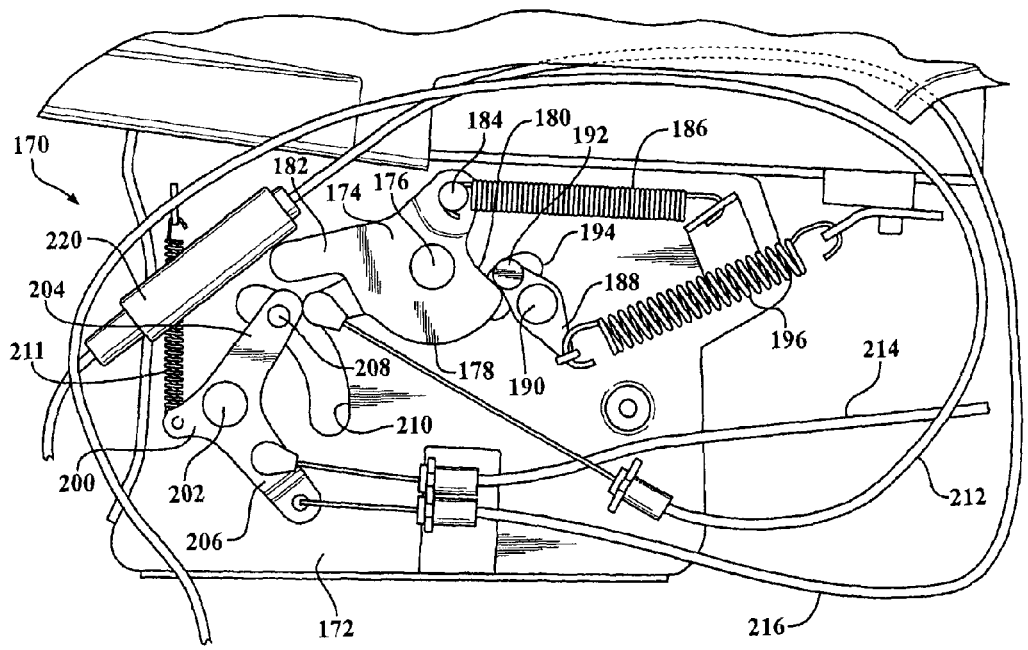
FIG. 10 is a plan view of the release mechanism in the locked position.
Figure 11:
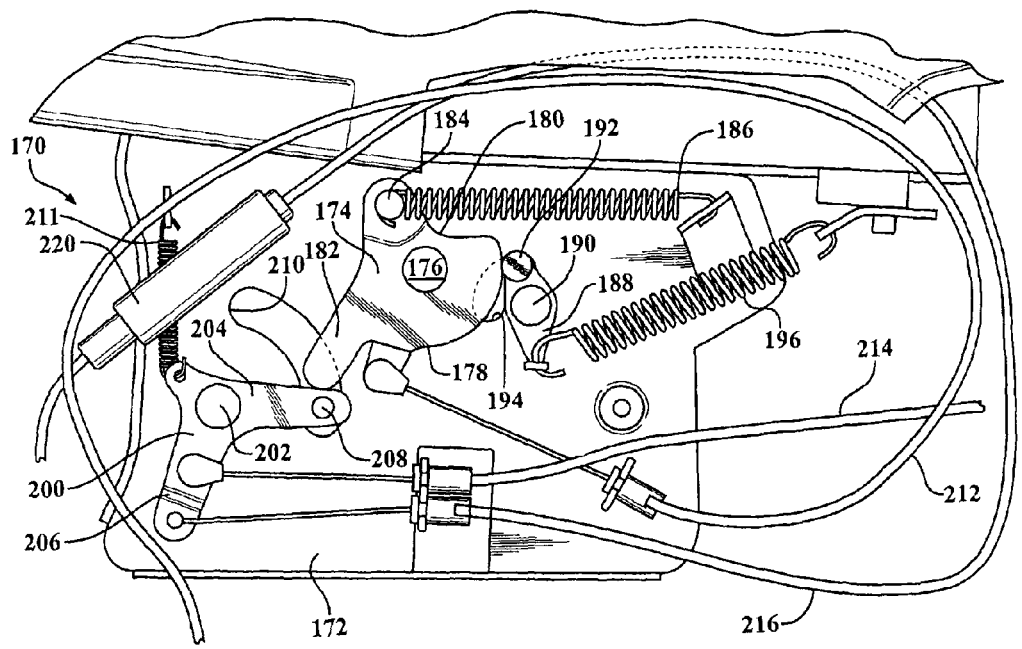
FIG. 11 is a plan view of the release mechanism in the actuated position.

Referring to FIGS. 10 and 11, the seat assembly 10 also includes a release mechanism 170 for synchronizing and automatically actuating and unlocking the riser assembly 20 and track assembly 150 to provide movement of the seat assembly 10 from the seating position to the stowed position in response to pivotal movement of the seat back 16. More specifically, the release mechanism 170 includes a support plate 172 mounted to the upper support plate 52. A trigger cam 174 is pivotally mounted to the support plate 172 by pivot post 176. The trigger cam 174 includes a peripheral arcuate cam surface 178 extending from a detent edge 180 to a trigger finger 182 opposite the detent edge 180. A spring post 184 projects from the trigger cam 174 adjacent the pivot post 176. A coil spring 186 extends from the support plate 172 to the spring post 184 for biasing the trigger cam 174 in the clockwise direction defining a locked condition. A control cam 188 is pivotally mounted to the support plate 172 by pivot post 190 adjacent the detent edge 180 of the trigger cam 174. The control cam 188 includes a first end and an opposite second end having a control pin 192 extending therefrom and guided in an arcuate slot 194 in the support plate 172. A coil spring 196 extends between the support plate 172 and the first end of the control cam 188 for biasing the control pin 192 against the detent edge 180 of the trigger cam 174. A latch link 200 is pivotally mounted to the support plate 172 by pivot post 202 adjacent the trigger finger 182 of the trigger cam 174. The latch link 200 is generally V-shaped and includes a latch finger 204 for cooperating with the trigger finger 182 and a pull finger 206 offset from the latch finger 202. The latch finger 202 includes a latch pin 208 guided in an arcuate slot 210 in the support plate 172.

A first pull cable 212 extends between a first end connected to the trigger cam 174 and a second end connected to the seat back 16 for rotating the trigger cam 174 in the counterclockwise direction in response to forward pivotal movement of the seat back 16 toward the fold flat position. A second pull cable 214 extends between a first end connected to the pull finger 206 of the latch link 200 and a second end connected to synch rod 78 of the riser assembly 20, as shown in FIG. 7. A third pull cable 216 extends between a first end connected to the pull finger 206 of the latch link 200 and a second end connected to a seat track lift plate 218, shown in FIG. 12, for actuating the seat track locking mechanism 160. A tensioner 220 is mounted inline on the third pull cable 216 for controlling slack in the cable 216 as is commonly known in the art.

In operation, referring again to FIG. 1, the seat assembly 10 is shown in the upright seating position. The seat back 16 may be pivoted between a plurality of reclined positions by pivoting the release lever 84 upwardly or counterclockwise as shown. The release lever 84 actuates the disc recliners 50 from the locked condition to the unlocked condition allowing pivotal movement of the seat back 16 relative to the seat cushion. The seat assembly 10 may also be adjusted fore and aft by the track assembly 150. The locking mechanism 160 is actuated between the locked and unlocked condition by lifting the towel bar 162 thereby allowing the upper tracks 152, 154 to slide fore and aft along the lower tracks 156, 158 and provide sliding movement of the seat cushion 12 and seat back 16 relative to the riser assembly 20. Actuation of the release mechanism 170 provides synchronized and automatic movement of the seat assembly 10 from the seating position to the forward tumbled position and then the stowed position within the recess 22 in the floor 14 of the vehicle. More specifically, again the release lever 84 is pivoted upwardly to actuate the disc recliners 50 between the locked and unlocked positions. The seat back 16 is then pivoted from one of the reclined position towards the fold flat position. A pair of torsion bar springs 198, 199 are coupled between the seat back frame 38 and the seat cushion brackets 34, 36 for biasing the seat back towards the fold flat position. As the seat back 16 pivots forwardly, the cam lobe 146 engages the notched end 142 of the cam profile edge 140 to pivot the release cam 136 and pull on the cable 128. The pulling of tension on cable 128 rotates the release arm 122 against the biasing force of the torsion spring 126 to release the locking pawl 124 from the notch 123 in the head restraint post 114. The torsion spring 120 automatically pivots the head restraint 24 about the pivot bracket 110 from the upright support position to the folded position against the seat back 16.

Simultaneously with the pivoting of the seat back 16 towards the fold flat position, the first pull cable 212 is pulled in tension to actuate the trigger cam 174. However, the control cam 188 engages the trigger cam 174 to control and slow rotation thereof to allow the head restraint 24 to pivot to the folded position prior to the seat back 16 reaching the fold flat position against the seat cushion 12. That is, the control pin 192 on the control cam 188 engages the detent edge 180 on the trigger cam 174. The control cam coil spring 196 is stronger than the trigger cam coil spring 186 to create pressure against the trigger cam 174 and control the rotation thereof until the control pin 192 reaches the arcuate cam surface 178 along the trigger cam 174. As the seat back 16 continues pivoting to the fold flat position, the trigger cam 174 rotates counterclockwise, as shown in FIGS. 10 and 11. The trigger finger 182 engages the latch pin 208 on the latch finger 204 to pivot the latch link 200 in the clockwise direction. During rotation of the latch link 200, the pull finger 206 simultaneously pulls the second and third pull cables 214, 216 in tension. The second pull cable 214 rotates the synch rod 78 to release the latch hooks 74, 76 from engagement with the striker bars 80, 82 thereby releasing the rear legs 70, 72 of the riser assembly 20 from the floor 14. With the rear legs 70, 72 released from the floor 14, the riser assembly 20 is biased by the assist spring 69 to pivot about the upper pivot end of the front legs 56, 58 to the tumbled position. The link 83 retracts the rear legs 70, 72 from the extended position to the retracted position against the seat cushion 12 as the riser assembly 20 pivots about the front legs 56, 58 to the tumbled position.

Figure 13:
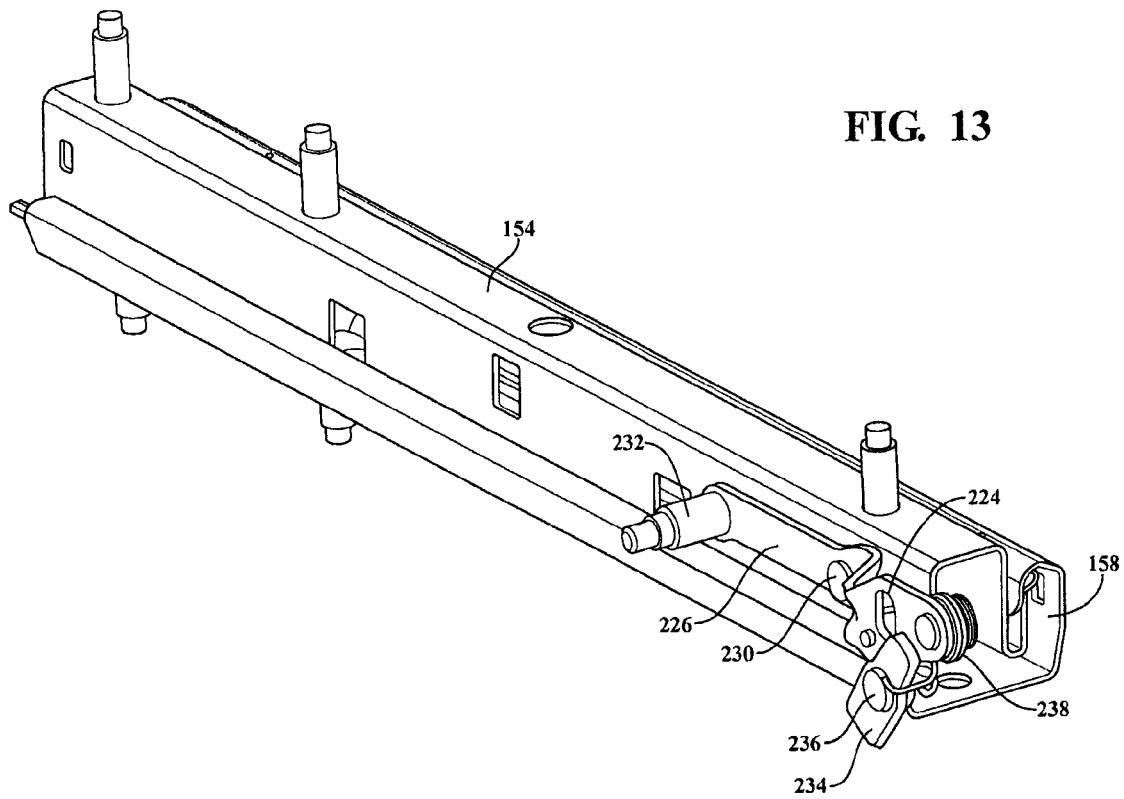
FIG. 13 is a perspective view of a seat track hold open latch for actuating the seat track as the seat assembly rotates between the seating position and stowed position.

The third pull cable 216 lifts the seat track lift plate 218 to raise the towel bar 162 and actuate the seat track locking mechanism 160 from the locked condition to the unlocked condition. Referring to FIGS. 12 and 13, the lift plate 218 includes a first end pivotally coupled to the upper track 154 and a U-shaped second end for supporting the towel bar 162. A pin 222 extends outwardly from the lift plate 218 and is received in a slot 224 in a hold open latch 226 mounted on the upper track 154. The hold open latch 226 is fixedly connected to the upper track 154 by fastener 230. A pivot post 232 projects outwardly from one end of the hold open latch 226 for pivotally mounting the lift plate 218 to the upper track 154. A lift cam 234 is pivotally mounted to the opposite end of the hold open latch 226 by pivot pin 236. A torsion spring 238 is coupled between the latch 226 and the lift cam 234 for biasing the lift cam 234 in the counterclockwise direction. In operation, as the lift plate 218 is pivoted upwardly by the third pull cable 216, the pin 222 slides upwardly in the slot 224 until the lift cam 234 rotates counterclockwise to support the pin 222 and hold the seat track locking mechanism 160 in the unlocked condition. As the seat assembly 10 pivots about the front legs 56, 58 to the tumbled position, the seat cushion 12 slides forwardly along the riser assembly 20 by the track assembly 150 until the seat cushion 12 reaches a full forward position. In the full forward position, the lift cam 234 engages a front stop 240 projecting from the lower track 158 to rotate the lift cam 234 in the clockwise direction, releasing the lift cam 234 from engagement with the pin 222 and returning the locking mechanism 160 to the locked condition.

Further, as the seat back 16 reaches the fold flat position, the first pull cable 212 pulls and rotates the trigger cam 174 until the trigger finger 182 passes beyond the latch pin 208 on the latch finger 204, as shown in FIG. 11. The coil spring 211 rotates the latch link 200 counterclockwise to return to its initial position and the coil spring 186 rotates the trigger cam 174 clockwise to return to its initial position, as shown in FIG. 10.

The seat assembly 10 has now been automatically moved from the seat position to the tumbled position wherein the head restraint 24 is in the folded position against the front surface of the seat back 16, the seat back 16 is pivoted to the fold flat position against the seat cushion 12, and the seat cushion 12 has been rotated by the riser assembly 20 about the front legs 56, 58 to the tumbled position. Finally, from the tumbled position, the seat assembly 10 may be rotated about the lower ends of the front legs 56, 58 for movement to the stowed position in the recess 22 of the floor 14. Additionally, the transfer rod 68 forces the front legs 56, 58 to slide laterally along the slide rods 64, 66 for offset alignment and positioning of the seat assembly 10 with a laterally offset recess 22 in the floor 14.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly secured to the floor of an automotive vehicle comprising:
a seat cushion;
a seat back pivotally coupled to said seat cushion for movement between a plurality of reclined seating positions and a fold flat position overlying said seat cushion;
a recliner assembly operatively coupled between said seat back and said seat cushion for actuation between a locked condition and an unlocked condition to provide said pivotal movement of said seat back;
a riser assembly pivotally coupled to said seat cushion and adapted to be pivotally latched to the floor for actuation between a latch condition and unlatched condition to allow pivotal movement of said seat cushion between a horizontal seating position and a forwardly upright tumbled position with said seat back in said fold flat position; and
a release mechanism operatively coupled between said seat back and said riser assembly for automatically synchronizing actuation of said recliner assembly and said riser assembly to provide movement of said seat assembly to said tumbled position in response to said pivotal movement of said seat back to said fold flat position.

2. The seat assembly as set forth in claim 1 further including a seat track assembly operatively coupled between said seat cushion and said riser assembly between a locked and unlocked condition for providing selective fore and aft sliding movement of said seat cushion relative to the said riser assembly.

3. The seat assembly as set forth in claim 2 wherein said release mechanism is operatively coupled between said seat back and said seat track assembly for automatically synchronizing actuation of said seat track assembly in response to pivotal movement of said seat back to said fold flat position.

4. The seat assembly as set forth in claim 3 wherein said release mechanism includes a support plate fixedly secured to said seat cushion, a trigger cam pivotally coupled to said support plate and operatively coupled to said seat back, and a latch link pivotally coupled to said support plate and operatively coupled to said riser assembly and said track assembly.

5. The seat assembly as set forth in claim 4 wherein said trigger cam is pivotally connected to said support plate for rotation between a first position and a second position in response to pivotal movement of said seat back to said fold flat position, said release mechanism including a first biasing member coupled between said trigger cam and said support plate for biasing said trigger cam in said first position.

6. The seat assembly as set forth in claim 5 wherein said latch link is pivotally connected to said support plate for rotation between a first position and a second position in response to rotation of said trigger cam between said first position and said second position, said release mechanism including a second biasing member coupled between said latch link and said support plate for biasing said latch link in said first position.

7. The seat assembly as set forth in claim 6 wherein said latch link includes a latch finger and a pull finger offset from said latch finger, said trigger cam including a trigger finger for engaging said latch finger to rotate said latch link between said first and second positions in response to rotation of said trigger cam between said first and second position.

8. The seat assembly as set forth in claim 7 wherein said release mechanism further includes a control cam pivotally coupled to said support plate and engaged with said trigger cam for controlling rotation of said trigger cam between said first and second positions, and a third biasing member extending between said control cam and said support plate for biasing said control cam against said trigger cam.

9. The seat assembly as set forth in claim 8 wherein said release mechanism includes a first pull cable connected between said trigger cam and said seat back for rotating said trigger cam between said first and second positions in response to pivotal movement of said seat back toward said fold flat position.

10. The seat assembly as set forth in claim 9 wherein said release mechanism includes a second pull cable connected between said pull finger of said latch link and said riser assembly for actuating said riser assembly between said latched and unlatched conditions in response to rotation of said latch link between said first and second positions.

11. The seat assembly as set forth in claim 10 wherein said release mechanism includes a third pull cable connected between said pull finger of said latch link and said seat track assembly for actuating said seat track assembly between said locked and unlocked conditions in response to rotation of said latch link between said first and second positions.

12. The seat assembly as set forth in claim 11 wherein said seat track assembly includes a pair of spaced apart and parallel upper tracks fixedly secured to said seat cushion, a pair of spaced apart and parallel lower track fixedly secured to said riser assembly and slidably coupled to said upper tracks for providing said fore and aft sliding movement of said seat assembly, and a locking mechanism operatively coupled between said upper and lower track for actuation between said locked and unlocked conditions.

13. The seat assembly as set forth in claim 12 wherein said seat track assembly includes a seat track lift plate pivotally coupled to one of said upper tracks for actuating said locking mechanism between said locked and unlocked conditions, said third pull cable coupled between said pull finger of said latch link and said seat track lift plate, and a hold open latch fixedly secured to said upper track and operatively coupled to said seat track lift plate, said hold open latch including a lift cam pivotally mounted thereto for selectively engaging said seat track lift plate to hold said seat track assembly in said unlocked condition as said seat assembly pivots from said seating position to said tumbled position.

14. The seat assembly as set forth in claim 13 wherein said hold open latch includes a spring coupled between said lift cam and said hold open latch for biasing said lift cam into engagement with said seat track lift plate to maintain said seat track assembly in said unlocked condition.

15. The seat assembly as set forth in claim 14 wherein said riser assembly includes an upper support plate coupled to said seat cushion and a lower support plate adapted to be fixedly secured to the floor, a pair of spaced apart front legs extending between a first end pivotally coupled to said upper support plate and an opposite second end pivotally coupled to said lower support plate, a pair of spaced apart rear legs extending between an upper end pivotally coupled to said upper support plate and an opposite lower end adapted to be releasably latched to the floor.

16. The seat assembly as set forth in claim 15 wherein said riser assembly includes a latch hook pivotally coupled to said lower of said rear legs for selectively engagement with the floor, said latch hook operatively coupled to said latch link by said second pull cable for controlling actuation of said riser assembly between said latched and unlatch condition in response to pivotal movement of said seat back toward said fold flat position.

17. The seat assembly as set forth in claim 16 wherein said riser assembly includes a link extending between at least one of said rear legs and at least one of said front legs for pivoting said rear legs between an extended position for engagement with the floor and a retracted position recessed against said seat cushion in said tumbled position.

18. The seat assembly as set forth in claim 17 wherein said riser assembly includes a pair of lateral slide rod fixedly secured to said lower support plate and pivotally supporting said second ends of said front legs and a transfer rod extending between a first end connected to said upper support plate and a second end connected to said lower support plate for providing lateral sliding movement of said riser assembly along said slide rods in response to pivotal movement of said seat assembly from said tumbled position to a stowed position recessed against the floor.

19. The seat assembly as set forth in claim 18 further including a head restraint assembly operatively coupled to said seat back for pivotal movement between an upright support position and a folded position overlying said seat back in response to pivotal movement of said seat back toward said fold flat position.

20. The seat assembly as set forth in claim 19 wherein said head restraint assembly includes a pivot bracket fixedly secured to said seat back, a pair of head restraint posts pivotally coupled to said pivot bracket, a release arm pivotally coupled to said pivot bracket and having a locking pawl extending therefrom for engagement with one of said head restraint posts for releasable retaining said head restraint in said upright support position.

21. The seat assembly as set forth in claim 20 wherein said head restraint assembly includes a release cam pivotally coupled to said seat back adjacent said recliner assembly and operatively coupled to said release arm by a pull cable, said release cam including an outer cam profile edge extending from a notched end to a distal end, and a cam lobe for engaging said notched end to pivot said release cam and said release arm thereby releasing said locking pawl from engagement with said head restraint post to allow automatic pivotal movement of said head restraint from said upright support position to said folded position in response to pivotal movement of said seat back toward said fold flat position.

* * * * *